(12) United States Patent
Perrier et al.

(10) Patent No.: US 7,878,021 B2
(45) Date of Patent: Feb. 1, 2011

(54) SIMPLIFIED ICE-CREAM MAKER (75) Inventors: Matthieu Perrier, Tarbes (FR);
Alexandre Rouches, Horgues (FR);
Régis Cypres, Poueyferre (FR); Hervé Fiedos, Odos (FR)

(73) Assignee: Seb S.A., Ecully (FR)

( * ) Notice: Subject to any disclaimer, the term of this patent is extended or adjusted under 35 U.S.C. 154(b) by 102 days.

(21) Appl. No.: 11/816,118

(22) PCT Filed: Feb. 15, 2006

(86) PCT No.: PCT/FR2006/000348

§ 371 (c)(1),
(2), (4) Date: May 9, 2008

(87) PCT Pub. No.: WO2006/087468

PCT Pub. Date: Aug. 24, 2006

(65) Prior Publication Data

US 2008/0282723 A1 Nov. 20, 2008

(30) Foreign Application Priority Data

Feb. 16, 2005 (FR) ................................ 05 01573

(51) Int. Cl.
*A23G 9/10* (2006.01)
(52) U.S. Cl. ........................ 62/342; 366/221; 366/230
(58) Field of Classification Search ........... 62/342–343; 366/221, 230–231
See application file for complete search history.

(56) References Cited

U.S. PATENT DOCUMENTS

| | | | |
|---|---|---|---|
| 3,780,536 A * | 12/1973 | Fishman et al. ................ 62/342 |
| 3,921,961 A | 11/1975 | Hapgood | |
| 4,674,886 A * | 6/1987 | Uesaka et al. ................ 366/144 |
| 4,736,600 A | 4/1988 | Brown et al. | |
| 4,946,287 A * | 8/1990 | Barnard et al. ............... 366/343 |
| 5,022,315 A * | 6/1991 | Bertram et al. ................ 99/348 |
| D323,513 S * | 1/1992 | van Asten ..................... D15/82 |
| 5,701,747 A * | 12/1997 | Faiola et al. .................... 62/68 |
| 6,332,333 B1 * | 12/2001 | Lee .............................. 62/342 |
| 7,081,265 B2 * | 7/2006 | Wanat ......................... 426/524 |
| 2006/0263490 A1 * | 11/2006 | Wall et al. .................... 426/101 |

FOREIGN PATENT DOCUMENTS

| | | |
|---|---|---|
| EP | 0285213 A | 10/1988 |
| FR | 2622402 A | 5/1989 |
| GB | 2144208 A | 2/1985 |
| GB | 2187110 A | 9/1987 |
| GB | 2187471 | 9/1987 |
| JP | 60160847 | 8/1985 |
| JP | 2000050810 | 2/2000 |

* cited by examiner

*Primary Examiner*—William E Tapolcai
(74) *Attorney, Agent, or Firm*—Browdy and Neimark, PLLC (57) ABSTRACT

An ice-cream maker including a blade (30*a*) arranged in a double-walled container (20*a*), and a housing (1) containing a driving mechanism (10) that can generate a blade-rotating movement (30*a*) in relation to the double-walled container (20*a*), the double-walled container (20*a*) being composed of an external wall (23) and an internal wall (24) defining a housing (25) containing a phase changing mixture having a fusion range extending at least partially below 0° C. The inner wall (24) forms a vat (26), and the blade (301*a*; 30*b*') is used to scrape the inner wall (24; 24'). The blade (30*a*) forms a spoon.

32 Claims, 6 Drawing Sheets

SIMPLIFIED ICE-CREAM MAKER

The present invention relates to the making of frozen preparations in a double-walled container. The present invention concerns the general technical domain of ice-cream makers including a container with a double wall, in which is accomplished the freezing of a preparation.

The double-walled container forms a housing containing a phase changing mixture. If desired, one or several struts can be provided between the internal wall and the external wall of the container. The phase changing mixture is able to occupy a first physical state called a low temperature state, when the container is put in a freezer, and a second physical state, called a state high temperature, when the container is placed at room temperature. The phase transition between the low temperature state and the high temperature state is effected at a temperature lower than the freezing temperature of an aqueous or creamy mixture, to obtain a sorbet or an ice cream.

Prior to the making of a frozen preparation, the user first p-laces the container in a freezer, to bring the phase changing mixture to the low temperature state. For making the frozen preparation, the user starts the ice-cream maker and pours an aqueous or creamy mixture into the container. Upon contact with the internal wall of the container, the aqueous or creamy mixture becomes frozen. A blade coming to scrape the wall allows to detach the formed frozen product and to place it in suspension in the mixture, until the whole preparation is frozen. Notably, the blade can be driven in rotation with respect to a container maintained fixed, or the container can be driven in rotation with respect to the blade maintained fixed.

Ordinarily, the preparation produced in the double-walled container is produced in a rather large quantity forming several servings. The frozen preparation is then served out of the double-walled container.

There is known from the document JP 2000 050 810 an ice-cream maker including several double-walled containers having a capacity about 150 ml. Such capacity is adapted to an individual serving. A blade is arranged in each of the double-walled containers. The ice-cream maker includes a case containing a drive mechanism to generate a rotational movement of a blade with respect to the double-walled container. However, the user must withdraw at least a part of the case as well as the blade to be able to retrieve the double-walled container containing the frozen preparation. The use of such ice-cream maker remains restricting.

An object of the present invention is to provide an ice-cream maker having a less restricting use.

Another object of the present invention is to provide an ice-cream maker permitting consumption of the preparation to be facilitated.

Another object of the present invention is to provide an ice-cream maker having a compact structure.

Another object of the present invention is to provide an ice-cream maker having a more economical construction.

These objects are attained with an ice-cream maker comprising a blade arranged in a double-walled container, and a case containing a drive mechanism adapted to generate a rotational movement of the blade with respect to the double-walled container, the double-walled container including an outside wall and an internal wall defining a housing containing a phase changing mixture having a melting range extending at least partly below 0° C., the internal wall forming a vat, the blade being provided to scrape clean the internal wall, due to the fact that the blade forms a spoon. This arrangement allows a considerable simplification of the consumption of frozen preparation by allowing use of only the elements of the ice-cream maker to obtain and to enjoy the frozen preparation.

Advantageously, the blade has a concave part disposed at least partially in the vat. This arrangement helps to further the scraping and evacuation of the frozen preparation, the concave part allowing to limit the angular shift between the blade and the vat.

Advantageously then, the concave part presents two symmetrical lateral edges. This arrangement allows to simplify the design of the blade, to ameliorate perception by the user and also to allow a rotational movement of the blade with respect to the double-walled container in one sense of rotation or in the other depending on the positioning of the blade.

Advantageously still, the case forms a base and has a support organ extending above the base, the drive mechanism including a drive outlet arranged on the base and cooperating with a drive organ of the double-walled container, the blade being mounted on the support organ.

These objects are also attained with an ice-cream maker comprising a blade arranged in a double-walled container, and a case containing a drive mechanism adapted to generate a rotational movement of the blade with respect to the double-walled container, the double-walled container having an outside wall and an internal wall defining a housing containing a phase changing mixture having a melting range extending at least partly below 0° C., the internal wall forming a vat, the blade being provided to scrape clean the internal wall, due to the fact that the case forms a base and includes a support organ extending above the base, that the drive mechanism includes a drive outlet arranged on the base and cooperating with a drive organ for the double-walled container, and that the blade is mounted on the support organ. These arrangements allow to simplify the use of the ice-cream maker by limiting manipulations. The installation of the double-walled container and the blade are easy. After production of the frozen preparation, the user withdraws the blade and the double-walled container, and can directly consume the frozen preparation in the double-walled container.

Advantageously then the support organ is formed by a support arm. This arrangement allows to ameliorate the visibility of the contents of the double-walled container.

Advantageously still, the case presents with respect to the base a lateral opening provided for the installation or withdrawal of the work container. This arrangement allows to simplify the construction of the appliance. This arrangement also allows to render the use of the appliance very user-friendly.

Advantageously still, the case presents with respect to the base an upper opening provided for the installation or the withdrawal of the blade. This arrangement also allows to simplify the construction of the appliance. This arrangement also allows to render the use of the appliance very user-friendly, the user being able to directly observe the production of the frozen preparation.

Advantageously then the blade is eccentric with respect to the double-walled container. In other words, the vat is essentially scraped clean by only one of the lateral edges of the blade. This arrangement allows to reduce the size of the blade and to facilitate the consumption of frozen preparation.

Advantageously still, the blade presents a form conjugated, or adapted, to the form of the internal wall. This arrangement allows to scrape clean the internal wall over a greater height.

Advantageously still, a lower half of the vat defines an annular path, the blade presenting an end provided to scrape clean the annular path. This arrangement allows to augment the surface of the vat scraped clean by the blade, while contributing to assure a guidance of the blade.

Advantageously still, the blade is disposed in the double-walled container with an acute angle with respect to the perpendicular to the internal wall. This arrangement permits the scraping of the vat by the blade to be facilitated.

Advantageously still, the blade includes a handle adapted to be engaged in a work retaining conformation of the case. This arrangement allows the manipulation of the blade to be simplified.

Advantageously then, the handle is engaged in the work retaining conformation transversely with respect to the axis of rotation of the double-walled container. Preferably, the handle is engaged in the work retaining conformation radially with respect to the axis of rotation of the double-walled container.

Advantageously still the handle presents means for axial blocking of the blade with respect to the case. This arrangement allows to exert a scraping force on the lower part of the vat.

Advantageously still the handle presents means for transversal blocking of the blade with respect to the case. This arrangement allows to exert a scraping force on the lateral wall of the vat.

Advantageously still, the outside wall and the internal wall are made of plastic. An ice-cream maker having such a container is first of all economical to fabricate, the plastic material used for the internal wall being not very expensive. In addition, such material is inert with respect to the phase changing mixture contained in the housing. In addition, the transmission of heat from the preparation towards the phase changing mixture being less rapid, the adherence of the layer of frozen product formed on the internal wall is less. All of the preparation can be consumed.

Advantageously still, the volume of the vat is less than or equal to 200 ml. Such a volume is well suited for individual consumption. Advantageously then the volume of the vat is comprised between 80 and 120 ml.

Advantageously still the ice-cream maker comprises a second blade arranged in a second double-walled container, the drive mechanism being adapted to accomplish a rotational movement of the second blade with respect to the second double-walled container. To augment the volume of frozen preparation, a second double-walled container is preferable to a vat of larger capacity.

According to a first type of realization, the drive mechanism is associated with a motor arranged in the case. The ice-cream maker then forms an autonomous appliance. The motor can notably be powered from an electrical outlet or from batteries.

According to a second type of realization, the drive mechanism includes a drive shaft. The ice-cream maker then forms an accessory that can be used with an external motor.

The invention will be better understood from the study of the two following examples of realization, taken in a nonlimiting mariner, shown in the appended figures, in which.

Figure 1:
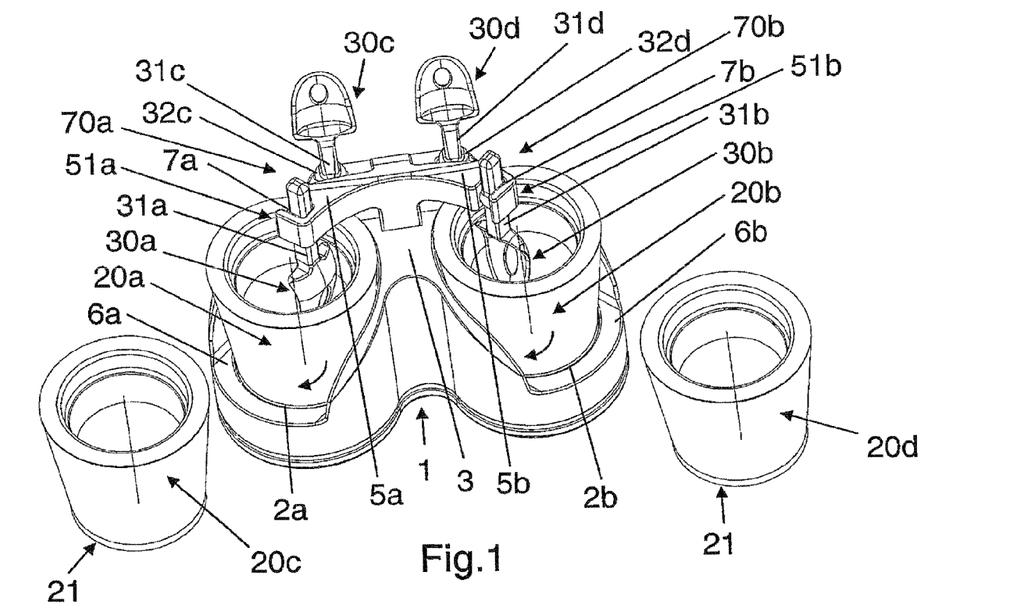
FIG. 1 is a perspective view of a first example of realization of an ice-cream maker including two double-walled containers, shown accompanied by two additional double-walled containers.
Figure 2:
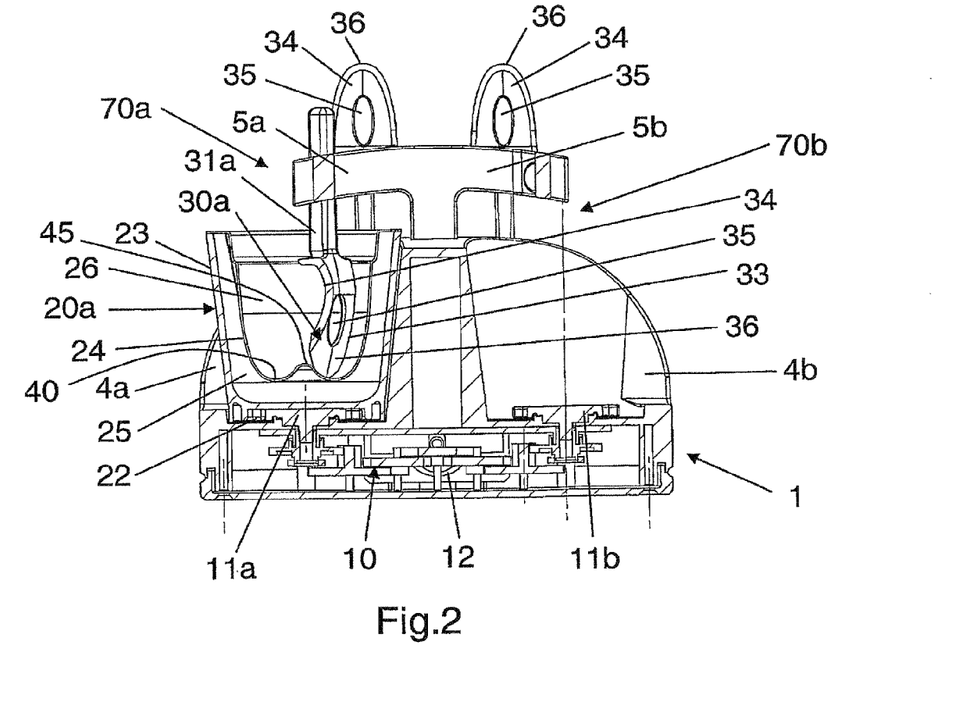
FIG. 2 is a vertical cross section of the ice-cream maker shown in FIG. 1, in which one of the double-walled containers and the associated blade have been removed from the case of the appliance.
Figure 3:
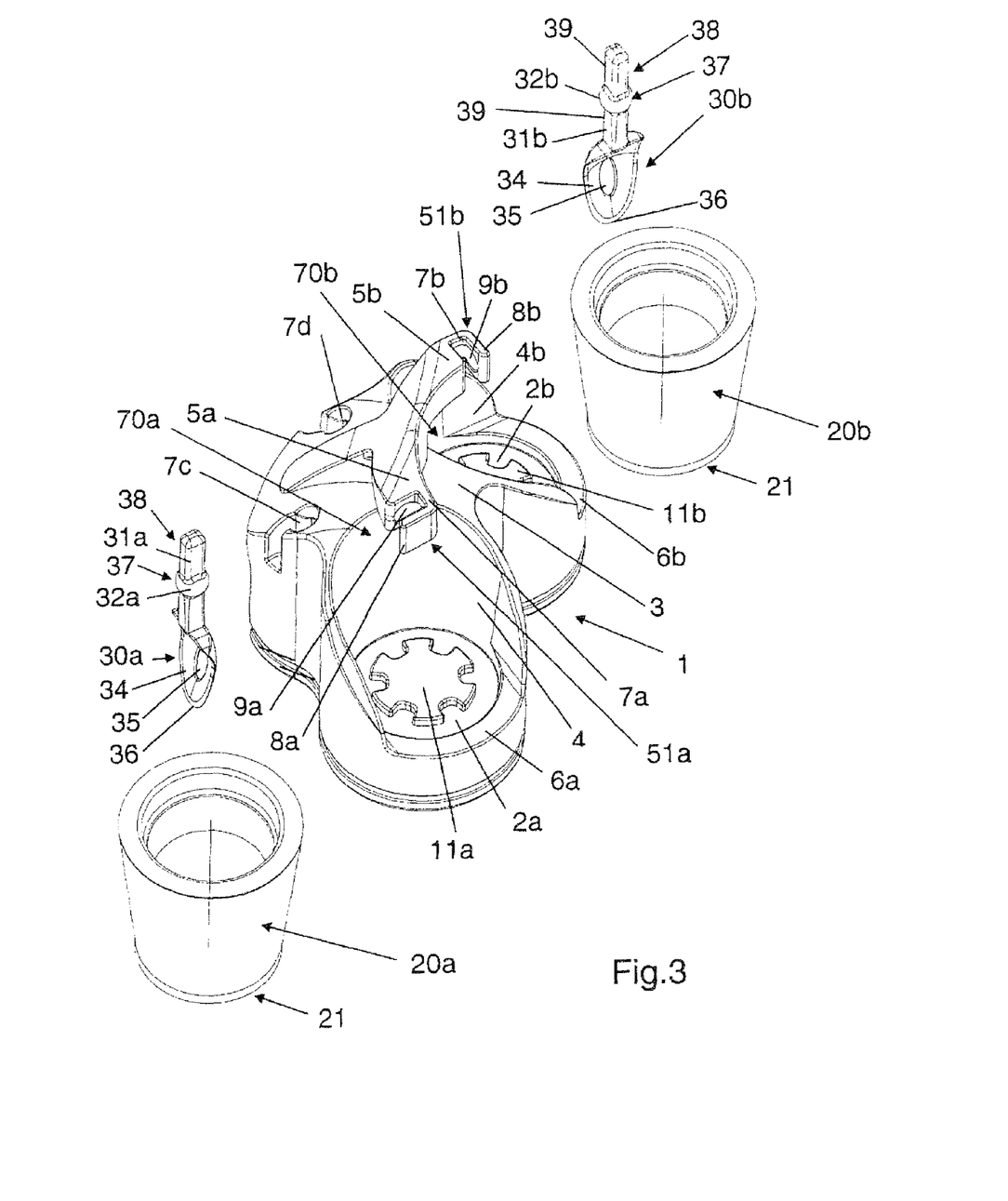
FIG. 3 is an exploded perspective view of the ice-cream maker shown in FIGS. 1 and 2, showing the double-walled containers and blades outside of the case of the appliance.

The ice-cream maker shown in FIGS. 1-3 comprises a case 1 forming two bases 2a, 2b. An upright 3 is arranged between bases 2a, 2b. A lateral wall 4a, 4b partially encircles each base 2a, 2b. Lateral walls 4a, 4b extend from upright 3. Case 1 has two support arms 5a, 5b each extending above one of bases 2a, 2b. Support arms 5a, 5b extend from upright 3.

Such as shown in FIG. 1, each base 2a, 2b is provided to receive a double-walled container 20a, 20b. Additional double-walled containers 20c, 20d can also be provided. Double-walled containers 20a, 20b, 20c, 20d are interchangeable. Lateral walls 4a, 4b have lateral openings 6a, 6b provided for the installation or the removal of double-walled containers 20a, 20b, 20c, 20d on bases 2a, 2b.

Case 1 includes two support organs 51a, 51b each extending above one of the bases 2a, 2b. Support organs 51a, 51b are each formed by one of the support arms 5a, 5b.

Case 1 presents two work retaining conformations 7a, 7b each arranged above one of the bases 2a, 2b. Thus, every work retaining conformation 7a, 7b is arranged above one of double-walled containers 20a, 20b placed on case 1. The work retaining conformations extend from support organs 51a, 51b. Each work retaining conformation 7a, 7b is provided on one of the support arms 5a, 5b. Thus each work retaining conformation 7a, 7b is provided on one of the support organs 51 has, 51b.

More particularly each work retaining conformation 7a, 7b includes a deformable retaining organ 8a, 8b. A concave part 9a, 9b is provided in each of the work retaining conformations 7a, 7b.

Case 1 presents two storage retaining conformations 7c, 7d. More particularly, storage retaining conformations 7c, 7d are arranged at the back of case 1.

Work retaining conformations 7a, 7b and storage retaining conformations 7c, 7d are provided to each accept a blade 30a, 30b, 30c, 30d. Such as visible in FIG. 1, each of the blades 30a, 30b is mounted on one of the support organs 51a, 51b.

Such as shown in FIG. 1, blades 30a, 30b engaged in work retaining conformations 7a, 7b are arranged in one of the double-walled containers 20a, 20b in place on corresponding base 2a, 2b. The two additional blades 30c, 30d are engaged in storage retaining conformations 7c, 7d. Blades 30a, 30b, 30c, 30d are interchangeable. As is clearly visible in FIG. 1, lateral walls 4a, 4b and support arms 5a, 5b provide upper openings 70a, 70b provided for the installation or the withdrawal of blades 30a, 30b in double-walled containers 20a, 20b.

Each blade 30a, 30b, 30c, 30d has a handle 31a, 31b, 31c, 31d adapted to be engaged in any one of the work retaining conformations 7a, 7b and the storage retaining conformations 7c, 7d. More particularly, each of the handles 31a, 31b, 31c, 31d has a thickened zone 32a, 32b, 32c, 32d adapted to be lodged in the concave part 9a, 9b of one of the work retaining conformations 7a, 7b. Each handle 31a, 31b, 31c, 31d has means 37 for axial blockage of the blade 30a, 30b, 30c, 30d with respect to case 1, formed by the thickened zone 32a, 32b, 32c, 32d, and means 38 for transverse blockage of the blade 30a, 30b, 30c, 30d with respect to the case 1, formed by the square section 39 above and below the thickened zone 32a, 32b, 32c, 32d.

Case 1 contains a drive mechanism 10 adapted to generate a rotational movement of at least one of the blades 30a, 30b, 30c, 30d with respect to one of the double-walled containers 20a, 20b, 20c, 20d in place on the corresponding base 2a, 2b.

More particularly, blades 30a, 30b are supported by case 1, and drive mechanism 10 is adapted to drive the double-walled containers 20a, 20b arranged on case 1 in rotation. For this purpose, such as shown in FIG. 2, drive mechanism 10 includes two drive outputs 11a, 11b, each arranged on one of the bases 2a, 2b. The drive outputs 11a, 11b rotate in the same sense. Drive mechanism 10 is associated with a motor 12 arranged in case 1. Each double-walled container 20a, 20b, 20c, 20d has a lower part 21 presenting a drive organ 22 adapted to be driven in rotation by one of the drive outputs 11a, 11b.

Such as shown in FIG. 1, handles 31a, 31b of blades 30a, 30b arranged in double-walled containers 20a, 20b are engaged in the corresponding work retaining conformation 7a, 7b transversely with respect to the axis of rotation of the double-walled container 20a, 20b.

Double-walled containers 20a, 20b, 20c, 20d, such as the double-walled container 20a shown in FIG. 4, include an outside wall 23 and an internal wall 24 defining a housing 25 containing a phase changing mixture having a melting range extending at least partly below 0° C. The phase changing mixture presents advantageously a melting range extending at least partly below −8° C., and preferably a melting range extending at least partly between −15° and −10° C. The phase changing mixture is for instance a saline mixture.

Internal wall 24 is made of plastic. Notably, HDPE, or high-density polyethylene, provides satisfactory properties. Internal wall 24 advantageously has a thickness comprised between 0.6 and 1 mm. Preferably, internal wall 24 has a thickness comprised between 0.7 and 0.9 mm. If desired, internal wall 24 can be coated.

Outside wall 23 can advantageously be made of plastic. Notably, PP, or polypropylene, provides satisfactory properties. Outside wall 23 can present a thickness greater than the thickness of internal wall 24, for instance of the order of 2 to 3 mm, to assure a good rigidity for the double-walled container 20a, 20b, 20c, 20d, and also to assure a more comfortable temperature for handling by the user. Preferably internal wall 24 has a thickness at least two times less than the thickness of outside wall 23. If desired, the use of expansion agents can be envisioned for outside wall 23.

To facilitate handling, outside wall 23 has a diameter of less than 12 cm.

Internal wall 24 forms a vat 26. The volume of vat 26 is preferably less than or equal to 200 ml. Advantageously, the volume of vat 26 is comprised between 80 and 120 ml.

Internal wall 24 can have external ribs 27 for a better rigidity. An annular shoulder 28 arranged in the upper part of internal wall 24 defines a filling level for vat 26 and also contributes to the rigidity of internal wall 24. An upper flange 29 contributes further to the rigidity of internal wall 24. Such geometry can be easily obtained by injection molding of plastic material.

Outside wall 23 presents an upper annular edge 53 assembled to an upper annular part 54 of internal wall 24. Outside wall 23 can be assembled to internal wall 24 notably by ultrasonic welding. The filling of housing 25 can be performed before assembly, or after assembly if outside wall 23 or internal wall 24 has a filling orifice able to be blocked by a plug. After assembly, double-walled containers 20a, 20b, 20c, 20d form one-piece bodies.

Figure 4:
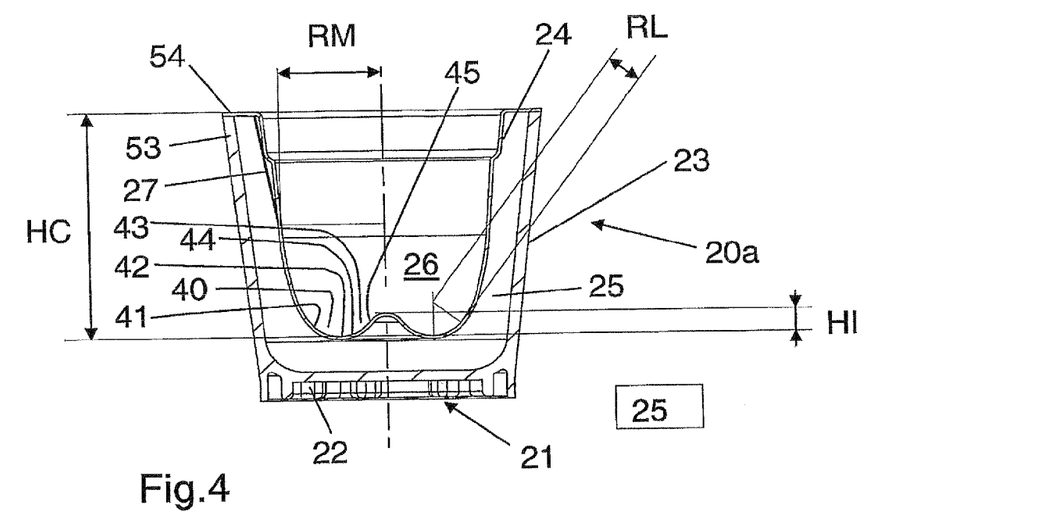
FIG. 4 is a cross-sectional view of a double-walled container belonging to the ice-cream maker shown in FIGS. 1-3.
Figure 5:
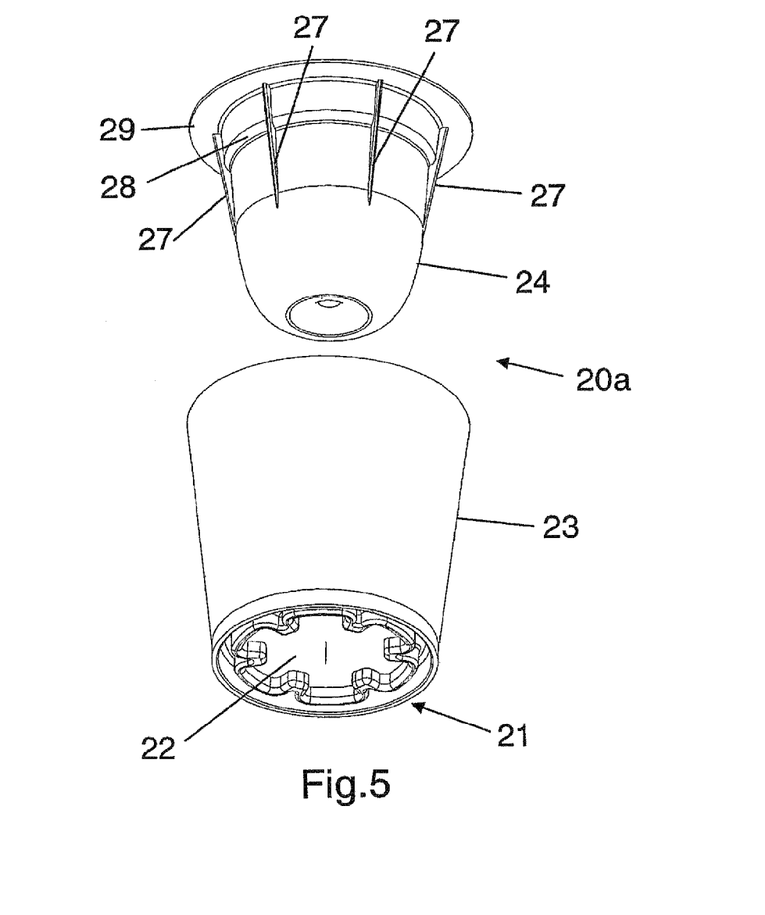
FIG. 5 is an exploded view of the double-walled container shown in the FIG. 4.
Figure 6:
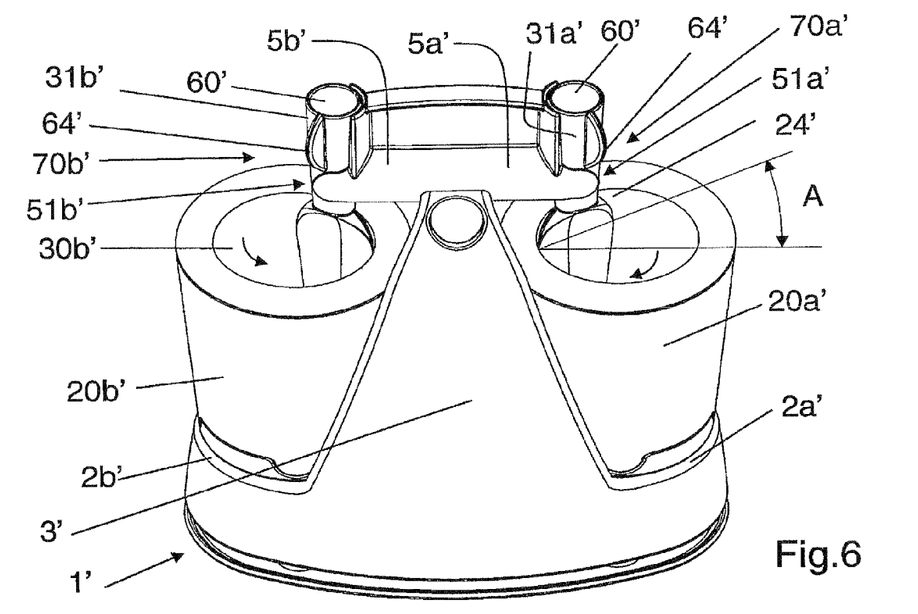
FIG. 6 is a perspective view of a second example of realization of an ice-cream maker including two double-walled containers.

As is clearly visible in FIGS. 2 and 4, vat 26 presents a geometry of revolution. Vat 26 has a height HC. The lower half of vat 26 has a maximum radius RM. Notably, the lower half of vat 26 presents a geometry of revolution beyond a radius equal to ½ of the maximum radius RM. The lower half of vat 26 presents, beyond a radius equal to ½ of the maximum radius RM, a thickness less than the thickness of outside wall 23.

The lower half of vat 26 defines an annular path 40 presenting an outside part 41 extending from a bottom 42 encircling an internal part 43. Bottom 42 defines the lowest zone of annular path 40. The curvature of outside part 41 varies according to height in vat 26 and can be defined by lateral radii of curvature RL, the value of the lateral radii of curvature RL varying with height in vat 26. Thus, the lateral radii of curvature RL of outside part 41 of annular path 40 are greater than ⅙ of the maximum radius RM of the lower half of vat 26. In addition, the height HI of internal part 43 of annular path 40 is less than ½ of the height HC of vat 26.

More particularly, internal part 43 of annular path 40 includes a concave portion 44 prolonging bottom 42. The curvature of concave portion 44 varies according to height in vat 26 and can also be defined by lateral radii of curvature RL. Lateral radii of curvature RL of concave portion 44 are greater than ⅙ of the maximum radius RM of the lower half of vat 26. Internal part 43 of annular path 40 includes a convex portion 45 encircled by concave portion 44. The bottom 42 of annular path 40 is arranged radially substantially in the middle of maximum radius RM of the lower half of vat 26.

As is visible in FIG. 2, annular path 40 is provided to receive one end 36 of one of the blades 30a, 30b, 30c, 30d.

Blades 30a, 30b, 30c, 30d form spoons. For this purpose each of blades 30a, 30b, 30c, 30d presents a concave part 34 connected to handle 31a, 31b, 31c, 31d. Concave part 34 is provided with an opening 35. Such as shown in FIG. 2, one of the blades 30a disposed in one of the double-walled containers 20a has a single lateral edge 33 placed in proximity to internal wall 24. To this end internal wall 24 presents a form of revolution. The other lateral edge is disposed in vat 26 at a distance from internal wall 24 except at the level of annular path 40. Thus blades 30a, 30b, 30c, 30d present a form conjugated to the form of internal wall 24, to assure an optimum scraping of the frozen preparation.

Blades 30a, 30b, 30c, 30d are symmetrical. Notably, concave part 34 presents two symmetrical lateral edges 33. The end 36 of blades 30a, 30b, 30c, 30d is provided to scrape clean annular path 40.

Such as shown in FIG. 1, blade 30a is mounted on support arm 5a and blade 30b is mounted on support arm 5b. Blades 5a, 5b are arranged perpendicularly to internal wall 24.

Case 1 presents with respect to each of bases 2a, 2b one of the lateral openings 6a, 6b provided for the installation or the removal of one of the working containers 20a, 20b, 20c, 20d.

Case 1 presents with respect to each of bases 2a, 2b one of the upper openings 70a, 70b provided for the installation or removal of one of the blades 30a, 30b, 30c, 30d.

Internal wall 24 can present a surface state that is more granular or rougher than blades 30a, 30b, 30c, 30d, to avoid the sticking of the frozen product to blades 30a, 30b, 30c, 30d.

The present embodiment works in the following way.

The user preliminarily places one or two of the double-walled containers 20a, 20b, 20c, 20d in the freezer, so as to place the phase changing mixture contained in housing 25 in the low temperature state. The phase changing mixture thus becomes refrigerated.

To produce a frozen preparation, the user puts one of the previously cooled double-walled containers 20a, 20b, 20c, 20d on one of the bases 2a, 2b, pours the preparation into the vat 26, puts in place the handle 31a, 31b, 31c, 31d of one of the blades 30a, 30b, 30c, 30d in the corresponding work retaining conformation 7a, 7b, and starts the appliance so that the double-walled container arranged on case 1 is driven in rotation. The handle 31a, 31b, 31c, 31d is engaged in the work retaining conformation 7a 7b transversely with respect to the axis of rotation of the double-walled container 20a, 20b, 20c, 20d. The concave part 34 of the blade 30a, 30b, 30c, 30d is then disposed in vat 26. The drive output 11a, 11b arranged on the base 2a, 2b cooperates with the drive organ 22 of the double-walled container 20a, 20b, 20c, 20d placed on the base 2a, 2b, such as shown in FIG. 2 for the double-walled container 20a placed on base 2a. As clearly shown in FIG. 1, blades 30a; 30b are eccentric with respect to double-walled containers 20a; 20b.

FIG. 2 shows blade 30a provided to scrape clean internal wall 24 after having been installed in double-walled container 20a. The elasticity of handle 31a allows lateral edge 33 to be pinned against internal wall 24. Thus, blade 30a exerts a force against internal wall 24, aiding detachment of the frozen preparation from internal wall 24.

The preparation contained in vat 26 is cooled down by the phase changing mixture present in housing 25. The low thermal conductivity of the plastic material of internal wall 24 (0.5 W/m.K for HDPE versus 160 W/m.K for aluminum) is compensated by the reduced thickness of internal wall 24 and by the limited volume of vat 26, as well as by the use of a phase changing mixture having a sufficiently low melting range. The freezing of the preparation occurs less rapidly than with an aluminum internal wall. This has as advantage that the scraping of the preparation performed by the blade 30a, 30b arranged in the vat 26 can be more moderate. The power of the motor coupled to the drive mechanism can be limited. If the user forgets to start the appliance before pouring the preparation into vat 26, the risk of complete freezing of the preparation can be avoided. In addition, the preparation continues to harden moderately over a comparatively long time, which can extend to an hour. This allows to take the time for tasting, without its being necessary to decant the preparation.

The proposed ice-cream maker presents a more user-friendly, less constraining use. The time necessary for preparation is less than for conventional appliances having an aluminum vat with a capacity of 1 liter. Several successive preparations can be produced with sets of previously cooled double-walled containers. The installation of the blades in the containers and the removal of the blades are made easier. The refrigerating effect of the phase changing mixture is progressive. An efficient scraping can be obtained on a large part of the surface of the vat. Consumption is made easier.

The ice-cream maker shown in FIGS. 6 to 9 uses most of the elements of the ice-cream maker shown in FIGS. 1 to 3, these elements being indicated by the same numerals supplemented by the symbol ', with nevertheless the following differences.

Figure 10:
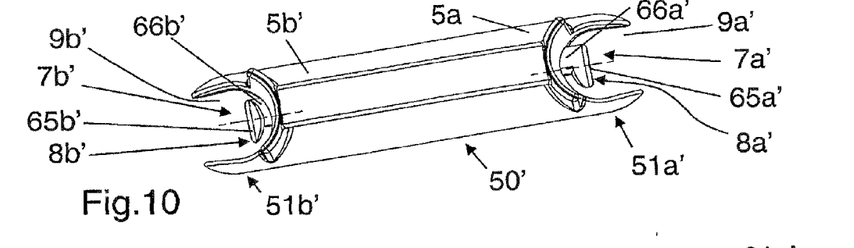
FIG. 10 is a perspective view of an element of the case of the ice-cream maker shown in FIGS. 6 and 7.

Case 1' includes two support arms 5a', 5b' extending from a part 50' shown in FIG. 10. Part 50' is attached to upright 31. Case 1' presents two work retaining conformations 7a', 7b' each arranged above one of the bases 2a', 2b'. Each work retaining conformation 7a', 7b' include a rigid retaining organ 8a', 8b'. A concave part 9a', 9b' is provided in each of the work retaining conformations 7a', 7b'.

Case 1' contains a drive mechanism 10' adapted to generate a rotational movement of at least one of the blades 30a', 30b' with respect to one of the double-walled containers 20a', 20b' in place on the corresponding base 2a', 2b'. More particularly, blades 30a', 30b' are supported by case 1', and drive mechanism 10' is adapted to drive double-walled containers 20a', 20b' arranged on case 1' in rotation in respectively opposite senses.

Figure 7:
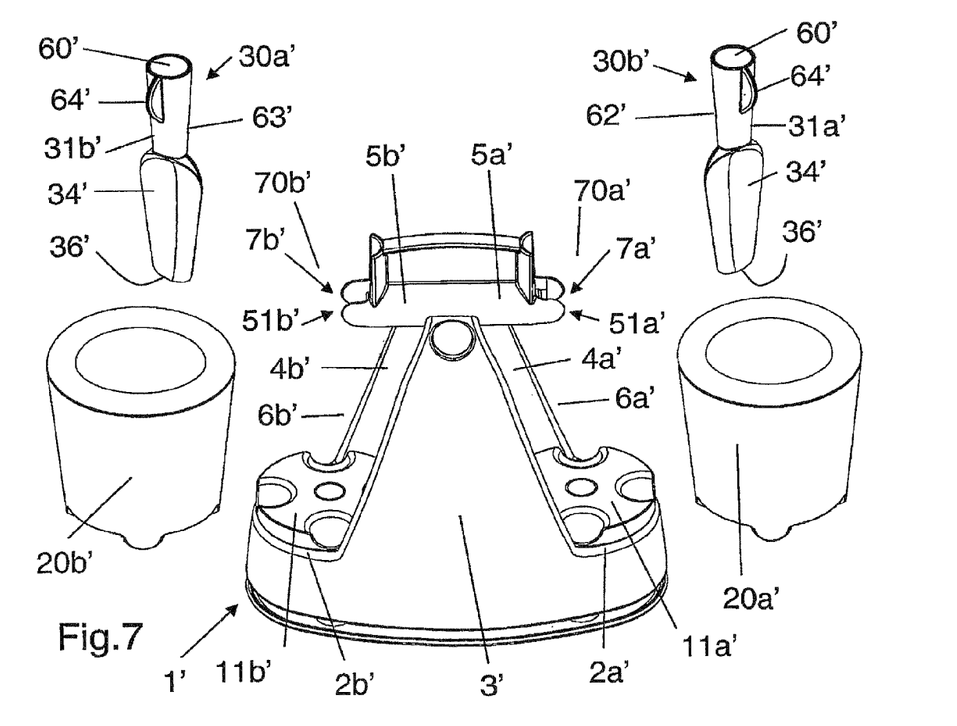
FIG. 7 is an exploded perspective view of the ice-cream maker shown in FIG. 6, showing double-walled containers and blades outside of the case of the appliance.
Figure 8:
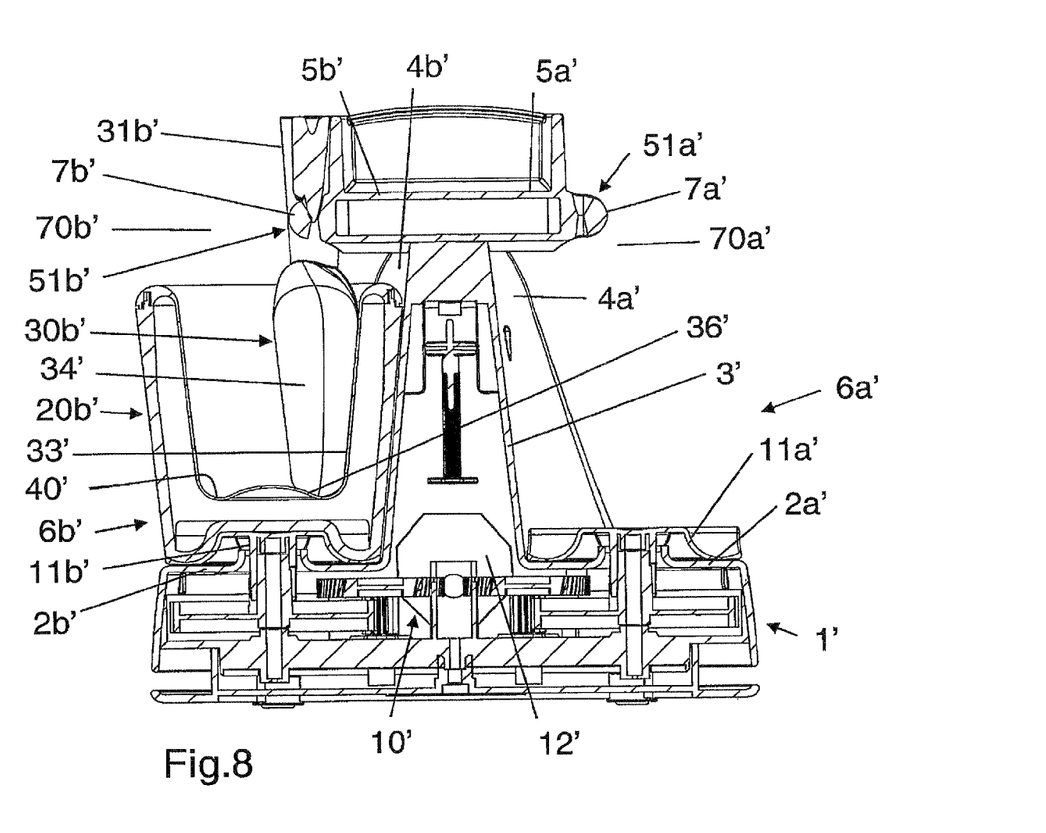
FIG. 8 is a vertical cross section of the ice-cream maker shown in FIG. 6, in which one of the double-walled containers and the associated blade have been removed from the case of the appliance, FIG. 9 a top view of the ice-cream maker shown in FIG. 6.
Figure 9:
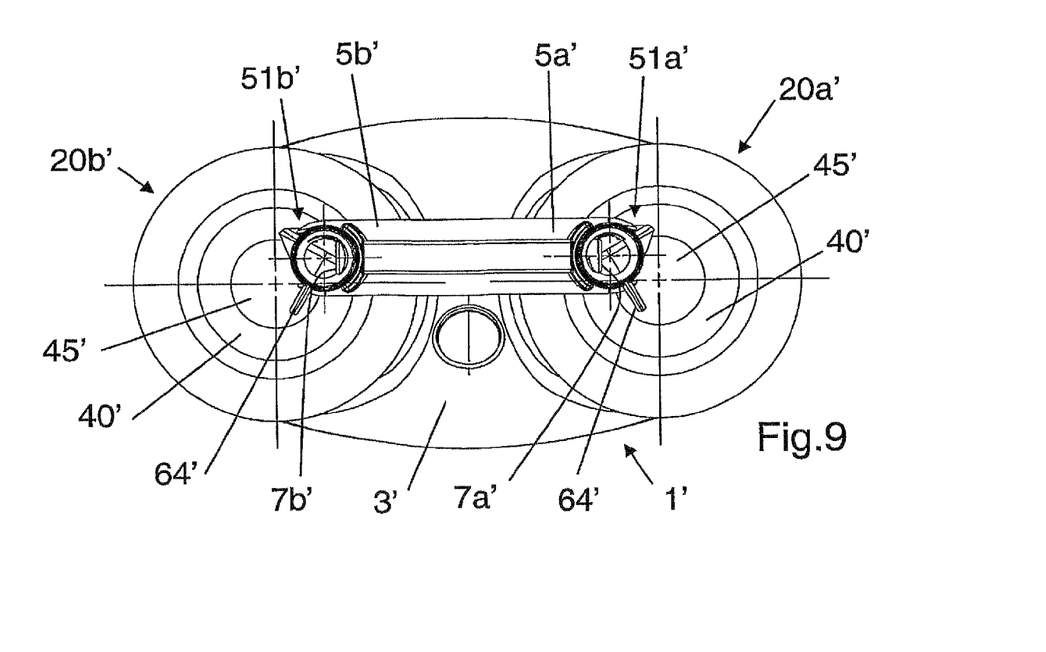
Figure 11:
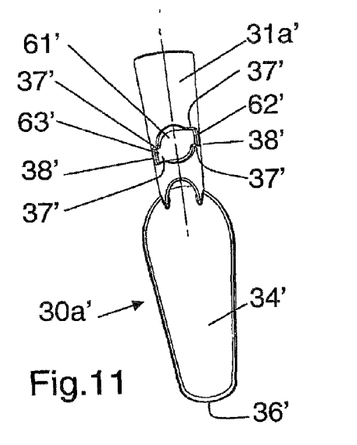
FIG. 11 is a rear perspective view of one of the blades of the ice-cream maker shown in FIGS. 6-9.

Blades 30a', 30b' shown in FIGS. 7, 8 and 11 are interchangeable. Each blade 30a', 30b' has a handle 31a', 31b' adapted to be engaged in either one of the work retaining conformations 7a', 7b'. More particularly, each of the handles 31a', 31b' presents an at least partial geometry of revolution, an internal hole 60', a lateral introduction passage 61' (visible in FIG. 11) opening into internal hole 60', two locking organs 62', 63' prolonging the lateral introduction passage 61', and a maneuvering organ 64'.

Maneuvering organ 64' is arranged on handle 31a', 31b' opposite lateral introduction passage 61'. The two locking organs 62', 63' are offset in height so as to impose a precise locking position when blades 30a', 30b' are put in place on case 1'. For this purpose the retaining organs 8a', 8b' have an abutment 65a', 65b' provided to pass by the lateral introduction passage 61' and a tenon 66a', 66b' connecting abutment 65' with the arm 5a', 5b'. Tenons 66a', 66b' are offset in height, the tenon 66a' being provided to receive locking organ 62' and tenon 66b' being provided to receive locking organ 63'. By this fact, blades 30a', 30b' are not entirely symmetrical. Nevertheless concave part 34' presents two symmetrical lateral edges 33'. Each handle 31a', 31b' presents axial means 37' for blocking the blade 30a', 30b' with respect to case 1', formed by the upper and lower edges of locking organs 62', 63', and means 38' for transverse blocking of the blade 30a', 30b' with respect to case 1', formed by the lateral end of locking organs 62', 63'.

Figure 12:
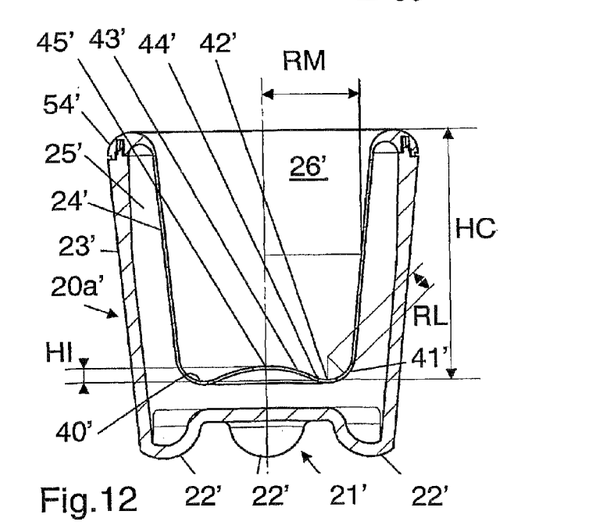
FIG. 12 is a cross-sectional view of a double-walled container belonging to the ice-cream maker shown in FIGS. 6-9.
Figure 13:
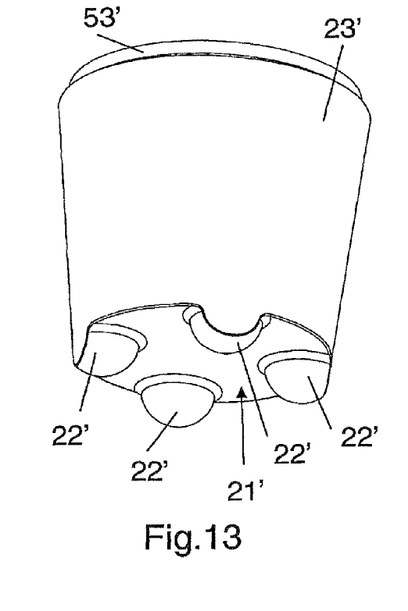
FIG. 13 is an exploded view in burst of the double-walled container shown in FIG. 12.

Double-walled containers 20a', 20b', such as the double-walled container 20a' shown in FIGS. 12 and 13, have an internal wall 24' free of longitudinal external ribs and an outside wall 23' presenting a ribbed upper annular edge 53'. Upper annular edge 53' is assembled with an upper annular part 54' of internal wall 24'. Upper annular part 54' forms a folded-over upper edge 55' ribbed in its lower part. Outside wall 23' can be assembled with internal wall 24', notably by friction welding. Internal wall 24' forms a vat 26' presenting, except for upper annular part 54', a thickness smaller than the thickness of outside wall 23'. Preferably vat 26' has, below upper annular part 54', a thickness at least two times less than the thickness of outside wall 23'. Such as represented in the example of realization shown in FIGS. 8 and 12, vat 26' has, below upper annular part 54', a thickness three times less than the thickness of outside wall 23'.

The curvature of outside part 41' of annular path 40' is constant and can be defined by a radius of lateral curvature RL. Thus the radius of lateral curvature RL of outside part 41' of annular path 40' is grater than ⅙ of the maximum radius RM of the lower half of vat 26'. In addition the height HI of internal part 43' of annular path 40' is less than ½ of the height HC of vat 26'. Internal part 43' of annular path 40' has a concave portion 44' prolonging the bottom 42'. The curvature of concave portion 44' is constant and can be defined by a radius of lateral curvature RL. The radius of lateral curvature RL of concave portion 44' is greater than ⅙ of the maximum radius RM of the lower half of vat 26'. Internal part 43' of annular path 40' has a convex portion 45' encircled by concave portion 44'. Bottom 42' of annular path 40' is arranged radially beyond half of the maximum radius RM of the lower half of vat 26'.

Blades 30a', 30b' form spoons having a concave part 34' free of openings. Blades 30a', 30b' are disposed in double-walled containers 20a', 20b' with an angle A that is acute with respect to the perpendicular to internal wall 24'. The angle A is for instance of the order of 45°. Blades 30a', 30b' are symmetrical and present a form conjugated to the form of internal wall 24', to assure an optimum scraping of the frozen preparation.

The principle of operation of the ice-cream maker shown in FIGS. 6 to 9 is similar to that of the ice-cream maker shown in FIGS. 1 to 3.

The user puts double-walled containers 20a', 20b' in place on drive outputs 11a', 11b'. The user then puts blades 30a', 30b' in double-walled containers 20a', 20b', translates them towards arms 5a', 5b' and turns them to block one of the locking organs 62', 63' with the corresponding tenon 66a', 66b'. As is clearly visible in FIG. 6, blades 30a'; 30b' are eccentric with respect to double-walled containers 20a'; 20b'. The user can pour the preparation into double-walled containers 20a', 20b' before or after the installation of blades 30a', 30b' or the starting of the motor 12'. The acute angle A associated with the cavity 34' of blades 30a', 30b' aids unsticking of the frozen preparation from wall 24'. When the preparation is ready, the user detaches blades 30a', 30b' by turning maneuvering organs of 64', pushes back or withdraws blades 30a', 30b', then raises and laterally translates double-walled containers 20a', 20b'. The preparation can then be directly consumed in double-walled containers 20a', 20b' with the aid of blades 30a', 30b'. The appliance is thus of a particularly user-friendly use.

Preferably the radius or radii of lateral curvature RL of outside part 41; 41' of annular path 40; 40' is/are greater than ¼ of the maximum radius RM of the lower half of vat 26; 26'.

Preferably still the height HI of internal part 43; 43' of annular path 40; 40' is less than ¼ of the height HC of vat 26; 26'.

As a variant, concave part 34; 34' of blade 30a; 30b; 30c; 30d; 30a', 30b' can be disposed at least partially in vat 26; 26'.

As a variant, the blades can be driven in rotation, the double-walled containers being able to then remain immobile, or not.

As a variant, support organs 51a, 51b, 51a', 51b' are not necessarily formed by support arms.

As a variant, several work retaining conformations could be arranged on the same support organ.

As a variant, the ice-cream maker can include only one single drive output, or on the contrary more than two drive outputs. Advantageously then the number of support organs is adapted to the number of drive outputs.

As a variant, the ice-cream maker can be without a motor, the drive mechanism including then a drive shaft provided to be driven by an external motor.

As a variant, double-walled containers 20a, 20b, 20c, 20d, 20a', 20b' are not necessarily used with an ice-cream maker. The user can put one of the double-walled containers 20a, 20b, 20c, 20d, 20a', 20b' in the freezer and then produce the frozen preparation by scraping clean internal wall 24, 24' with an appropriate utensil.

As a variant, at least a part of the lower half of outside wall 23, 23' has a diameter less than 12 cm.

The present invention is not at all restricted to the embodiments described and their variants, but includes numerous modifications in the framework of the claims.

The invention claimed is:

1. Ice-cream maker comprising:
a double-walled container;
a blade arranged in said container; and
a case containing a drive mechanism adapted to generate a rotational movement of the blade relative to the double-walled container,
the double-walled container having an outside wall and an internal wall, the outside wall and internal wall defining a housing containing a phase changing mixture having a melting range extending at least partially below 0° C.,
the internal wall forming a vat having a central axis, said vat having a lower half that presents an annular path,
the blade being provided to scrape clean the internal wall and the blade having a handle and a concave part connected to the handle and disposed at least partially in the vat, wherein the concave part forms a spoon having a bowl to obtain and taste the frozen preparation, wherein the blade presents an end configured to scrape clean the annular path, and
the handle being mounted in a position that is eccentric relative to the central axis of the vat, and only one lateral edge of the blade being placed in proximity to the internal wall of the container.

2. Ice-cream maker according to claim 1, wherein the concave part presents two symmetrical lateral edges.

3. Ice-cream maker according to claim 1, wherein:
the case forms a base and has a support organ extending above the base;
the drive mechanism includes a drive output arranged on the base and cooperating with a drive organ for rotating the double-walled container; and
the handle is mounted on the support organ.

4. Ice-cream maker comprising:
a double-walled container;
a blade arranged in the double-walled container; and
a case containing a drive mechanism adapted to generate a rotational movement of the double-walled container, the double-walled container having an outside wall and an internal wall, the outside wall and an internal wall defining a housing containing a phase changing mixture having a melting range extending at least partially below 0° C., the internal wall forming a vat, the blade being provided to scrape clean the internal wall, the case forming a base, and the drive mechanism including a drive output arranged on the base and cooperating with a drive organ of the double-walled container, wherein the case includes a support organ extending above the base, the blade is mounted on the support organ, and the blade is blocked against rotation relative to the support organ, wherein the support organ comprises a work retaining conformation and the blade has a handle adapted to be engaged in the work retaining conformation, the work retaining conformation and the handle are configured to block the handle in position transversely and axially relative to the work retaining conformation, and further wherein the drive mechanism engages the container to rotate the container about an axis, and the handle is engaged in the work retaining conformation transversely relative to the axis of rotation of the container.

5. Ice-cream maker according to claim 4, wherein the support organ is formed by a support arm.

6. Ice-cream maker according to claim 4, wherein the case presents with respect to the base a lateral opening provided for the installation and removal of the double-walled container.

7. Ice-cream maker according to claim 4, wherein the case presents with respect to the base an upper opening provided for the installation and removal of the blade.

8. Ice-cream maker according to claim 1, wherein the blade presents a form conjugated to the form of the internal wall.

9. Ice-cream maker according to claim 1, wherein the blade is oriented in the double-walled container with an angle (A) that is acute relative to the perpendicular to the internal wall.

10. Ice-cream maker according to claim 1, wherein the outside wall and the internal wall are made of plastic.

11. Ice-cream maker according to claim 1, wherein the volume of the vat is less than or equal to 200 ml.

12. Ice-cream maker according to claim 11, wherein the volume of the vat is comprised between 80 and 120 ml.

13. Ice-cream maker according to claim 1, further comprising a second double-walled container and a second blade arranged in the second double-walled container, and wherein the drive mechanism is adapted to produce a rotational movement of the second blade relative to the second double-walled container.

14. Ice-cream maker according to claim 1, wherein the drive mechanism is associated with a motor arranged in the case.

15. Ice-cream maker according to claim 4, wherein the blade is mounted in a position that is eccentric relative to the double-walled container.

16. Ice-cream maker according to claim 4, wherein the blade presents a form conjugated to the form of the internal wall.

17. Ice-cream maker according to claim 4, wherein a lower half of the vat presents an annular path and the blade presents an end configured to scrape clean the annular path.

18. Ice-cream maker according to claim 4, wherein the blade is oriented in the double-walled container with an angle (A) that is acute relative to the perpendicular to the internal wall.

19. Ice-cream maker according to claim 4, wherein the handle comprises means for blocking the blade axially relative to the case.

20. Ice-cream maker according to claim 4, wherein the handle comprises means for blocking the blade transversely relative to the case.

21. Ice-cream maker according to claim 4, wherein the volume of the vat is less than or equal to 200 ml.

22. Ice-cream maker according to claim 21, wherein the volume of the vat is comprised between 80 and 120 ml.

23. Ice-cream maker according to claim 4, wherein said ice-cream maker further comprises a second blade arranged in a second double-walled container, and the drive mechanism is adapted to produce a rotational movement of the second blade relative to the second double-walled container.

24. Ice-cream maker according to claim 4, wherein the drive mechanism is associated with a motor arranged in the case.

25. Ice-cream maker according to claim 1, wherein said container is open at the top while ice cream is being made.

26. Ice-cream maker according to claim 1, wherein said case is constructed to allow observation by a user of the production of ice cream in said container.

27. Ice-cream maker according to claim 1, wherein said case is constructed to allow said container to be inserted into said case when said blade is removed from said container, without requiring any disassembly of said case.

28. Ice-cream maker according to claim 1, wherein said blade is supported by said case.

29. Ice-cream maker according to claim 1, wherein said double-walled container is arranged on said case, and said drive mechanism is adapted to drive said double-walled contained in rotation.

30. Ice-cream maker according to claim 4, wherein said blade forms a spoon having a bowl.

31. Ice-cream maker according to claim 4, wherein the work retaining conformation has a side opening allowing insertion of the handle in a direction transverse to the axis of rotation of the container.

32. Ice-cream maker according to claim 1, wherein said vat has a bottom and said annular path forms part of said bottom and has a concave form.

* * * * *